United States Patent [19]

Masuda et al.

[11] Patent Number: 4,960,657
[45] Date of Patent: Oct. 2, 1990

[54] LITHIUM CELLS

[75] Inventors: Yoshitomo Masuda, Tachikawa; Masao Ogawa, Kawagoe; Katsuhiko Arai, Iruma; Kinya Suzuki; Tadashi Fuse, both of Kodaira; Tetsuro Amano, Tokyo, all of Japan

[73] Assignee: Bridgestone Corporation, Tokyo, Japan

[21] Appl. No.: 312,914

[22] Filed: Feb. 21, 1989

[30] Foreign Application Priority Data

| Mar. 1, 1988 | [JP] | Japan | 63-48419 |
| Mar. 1, 1988 | [JP] | Japan | 63-48420 |
| Mar. 10, 1988 | [JP] | Japan | 63-57016 |
| Jan. 24, 1989 | [JP] | Japan | 1-14432 |

[51] Int. Cl.$^5$ ............................................. H01M 6/14
[52] U.S. Cl. ................................... 429/194; 429/213; 429/218
[58] Field of Search ............... 429/195, 194, 197, 196, 429/213, 218

[56] References Cited

U.S. PATENT DOCUMENTS

| 3,415,687 | 12/1968 | Methlie | 429/195 |
| 3,645,795 | 2/1972 | Elliott et al. | 429/197 X |
| 4,717,634 | 1/1988 | Daifuku et al. | 429/213 |

*Primary Examiner*—Anthony Skapars
*Attorney, Agent, or Firm*—Oblon, Spivak, McClelland, Maier & Neustadt

[57] ABSTRACT

A lithium cell comprising a negative electrode containing lithium, a positive electrode, and an electrolyte disposed between the positive and negative electrodes is improved in internal resistance and shelf life when the negative electrode is surface treated with water, lithium hydroxide, a $PF_6$ ion-containing compound, or an $AsF_6$ ion-containing compound.

2 Claims, No Drawings

LITHIUM CELLS

BACKGROUND OF THE INVENTION

This invention relates to lithium cells, and more particularly, to lithium cells having a low internal resistance and improved shelf life, and additionally exhibiting improved cycle performance when constructed as secondary cells.

Because of their high voltage and capacity, an increasing demand is now imposed on lithium cells in a variety of applications covering from memory backups for personal computers and video cassette recorders to drive sources for cameras or the like. The improved features of lithium cells including high voltage and capacity are attributable to the use of lithium as negative electrode active material. However, lithium is so active and thus unstable that it immediately reacts with other materials as is well known in the art. For this reason, the electrolyte solution used in conventional lithium cells is an organic electrolyte solution which is generally believed to be relatively stable. Nevertheless, it is inevitable that the lithium negative electrode react with organic electrolyte solution during actual service of the cell, resulting in losses of various properties.

More particularly, primary lithium cells suffer from the following problem. Although the primary cell experiences only a discharge process, the discharge process produces active lithium ions which react with the electrolyte solution to form by-products. As the cell is used more times or shelf stored for a longer time, the cell increases its internal resistance, which disturbs discharge more or less. A more complex problem occurs with secondary lithium cells which involve a charging process in addition to a discharging process as in the primary cells. Probably because of the unevenness of pre-existing by-products, charging incurs uneven electrodeposition of lithium which grows as so-called dendrites, resulting in such failures as lithium removal and cell internal shortcircuiting.

In the state of the art, lithium must be processed before it can be used as cell electrodes, particularly as secondary cell electrodes. Several attempts have been made to solve the above problems by reducing the reactivity of lithium, for example, by alloying lithium with another metal or metals to form a lithium alloy or combining lithium with a carbon substrate to form a lithium-carbon composite material. These attempts provide more or less improvements, but are not fully successful. Particularly for secondary cells, it is desired to solve the problem that their performance is deteriorated with repetition of charge/discharge cycles.

SUMMARY OF THE INVENTION

Therefore, a primary object of the present invention is to provide a lithium cell having a low internal resistance and an improved shelf life.

Another object of the present invention is to provide a secondary lithium cell having a low internal resistance and an improved shelf life and exhibiting improved cycle performance.

In connection with a lithium cell comprising a negative electrode containing lithium, a positive electrode, and an electrolyte, we have found that the surface treatment of lithium-containing negative electrode materials including metallic lithium, lithium alloys, and lithium-carbon composite materials with (i) water, (ii) lithium hydroxide, (iii) a $PF_6$ ion-containing compound, or (iv) an $AsF_6$ ion-containing compound is effective in preventing the lithium in the negative electrode from reacting with the electrolyte to deteriorate the cell properties, thus improving various properties including internal resistance and shelf life as well as cell operations such as cycle performance when the associated cell is constructed as a secondary cell.

According to the present invention, there is provided a lithium cell comprising a negative electrode containing lithium, a positive electrode, and an electrolyte disposed between the positive and negative electrodes, wherein the negative electrode has a surface treated with a member selected from the group consisting of (i) water, (ii) lithium hydroxide, (iii) $PF_6$ ion-containing compounds, and (iv) $AsF_6$ ion-containing compounds.

DETAILED DESCRIPTION OF THE INVENTION

The lithium cell of the present& invention comprises a negative electrode which is prepared by treating the surface of a lithium-containing material with (i) water,
(ii) lithium hydroxide,
(iii) a $PF_6$ ion-containing compound, or
(iv) an $AsF_6$ ion-containing compound.

The lithium-containing materials adapted to form the negative electrode of the cell of the invention include metallic lithium, lithium alloys, and lithium-carbon composite materials, for example, but are not limited thereto. Examples of the lithium alloy include alloys of lithium with at least one member selected from aluminum, indium, bismuth, lead, tin, zinc, copper, and analogous alloying metals. Preferred alloys are lithium-aluminum alloys. The lithium alloy may be used as negative electrode material either in the form of a preformed alloy or a pressure bonded body of lithium and an alloying metal. In the latter case, the pressure bonded body is incorporated in a cell container and subsequently converted into an alloy at the end of cell fabrication. The negative electrode preferably contains at least 1% by weight, more preferably at least 5% by weight, most preferably at least 10% by weight of lithium.

The present concept of using the lithium-containing negative electrode which has been treated with moisture is quite unexpected from the prior art. The prior art common knowledge recommends to minimize the moisture content in fabricating a lithium cell since moisture reacts with lithium almost instantaneously. Therefore, the lithium cell of the present invention is in contrast to the prior art knowledge. The reason why cell property improvements are achieved by treating the lithium-containing negative electrode with moisture is not well understood. While not being bound to the theory, we suppose that by treating the surface of the lithium-containing negative electrode with moisture, one of reactants which react with lithium most vigorously, the lithium in the negative electrode reacts with moisture to form a coating on the negative electrode. This coating acts as a protective coating to effectively prevent the lithium in the negative electrode from further reacting with the electrolyte solution to deteriorate cell properties during charging or discharging process of the cell.

The negative electrode may be treated with moisture by any desired methods, for example, by contacting it with water vapor for several seconds, dipping it in an aqueous solution, or fabricating a cell with moisture intentionally contained in a cell component other than the negative electrode such as the positive electrode or separator whereby the negative electrode surface is treated in situ with moisture within the cell. Other various methods may be employed. In either case, it is preferred to treat the entire surface of the negative electrode such that no untreated portion may be left on the negative electrode.

The parameters used in the treatment with moisture including contact time and moisture concentration are not particularly limited and may be suitably selected depending on the particular method employed for the treatment. For example, when the negative electrode is contacted with a moist gas, the moisture content is preferably at least 0.1% (1000 ppm), more preferably at least 0.3% (3000 ppm). When the negative electrode is contacted with a water-containing liquid, the water content is preferably at least 0.1% (1000 ppm), more preferably at least 0.3% (3000 ppm). In the case of in situ contact wherein moisture is intentionally contained in a cell component other than the negative electrode such as the positive electrode or separator whereby the negative electrode is contacted with moisture within the cell, the water content of the relevant cell component is preferably at least 0.1%, more preferably at least 0.3%. In all cases, the upper limit of water content is preferably 50%, more preferably 30%.

In surface treating the negative electrode with moisture by either of the above-mentioned and other methods, some gases will sometimes be given off due to reaction of lithium with water depending on the extent of treatment. In case a noticeable amount of gas evolves, then it is desired to close the cell container after gas evolution is reduced, particularly after gas evolution ceases, ensuring better results. If the cell container is closed while a noticeable amount of gas is evolving, there is the likelihood that subsequently evolving gases would accumulate within the cell container, particularly on the electrode to be treated herein to create voids between positive and negative electrodes to increase the internal resistance, failing to accomplish the effectiveness of the moisture treatment. When a noticeable amount of gas evolves from the negative electrode, the following methods may be adopted to fabricate the cell. After the electrode is treated with moisture, it is allowed to stand until gas evolution decreases or ceases. The electrode is then introduced into the cell container along with other necessary parts and the container is finally sealed. Alternatively, after moisture treatment, the treated electrode is introduced into the cell container along with other necessary parts. The cell is allowed to stand with an opening unsealed until gas evolution decreases or ceases, and the container is finally sealed. Such a careful procedure is not necessary if gas evolution resulting from the moisture treatment is not substantial.

When the negative electrode to be subjected to the above-mentioned moisture treatment is of a modified lithium material such as lithium alloy and lithium-carbon composite material, the electrode may be subjected to moisture treatment during its preparation. In the case of lithium alloy, moisture treatment may be carried out during the alloying of lithium with another metal. In the case of lithium-carbon composite material, moisture treatment may be carried out during the consolidation of lithium and carbon into a composite. More particularly, the lithium alloy may be electrochemically formed by electrodepositing lithium on an alloying metal in an organic solvent containing a lithium salt. If moisture is present in at least one of the lithium source, alloying metal and organic solvent, then moisture treatment takes place at the same time as the incorporation of lithium with the alloying metal.

In one preferred embodiment of the present invention, the moisture treatment is carried out by placing a positive electrode containing water, a negative electrode containing lithium, and electrolyte in a cell container whereby the moisture content of the positive electrode is utilized to effect moisture treatment of the negative electrode within the confine of the cell container. The preferred positive electrodes used for this purpose are of electroconductive polymers, typically polyaniline and derivatives thereof. The positive electrode preferably has a moisture content in the range between more than 1,000 parts and 50,000 parts by weight per million parts (ppm) of the electrode material, more preferably in the range between 3,000 ppm and 10,000 ppm as measured by Karl Fischer's method. Preferably the positive electrode has such an initial moisture content that its moisture content is reduced to at most ⅓, especially at most 1/10 of the initial content after the treatment of the negative electrode with the moisture content of the positive electrode.

As opposed to the prior art common knowledge that the content of moisture which reacts with lithium vigorously should be controlled as low as possible in fabricating a non-aqueous electrolyte lithium cell, the present invention uses a positive electrode material containing a relatively large amount of water. In face, U.S. Pat. No. 4,717,634 recommends to minimize the moisture content of a positive electrode comprising polyaniline. If a substantial amount of moisture is present in the interior of the cell, moisture will instantaneously react with lithium, resulting in losses of various cell properties. In contrast, according to the preferred embodiment of the present invention, the electroconductive polymer used as the positive electrode is controlled to a moisture content in the range between more than 1,000 ppm and 50,000 ppm, especially between 3,000 ppm and 10,000 ppm. Then, the controlled content of moisture slowly reacts with lithium without deteriorating cell performance. In addition, quite unexpectedly, initial discharge and long-term shelf storage are rather improved when the moisture content of the positive electrode is reduced to ⅓ of lower of the initial moisture content by the subsequent reaction with lithium in the cell.

It is true that a too much moisture content should be avoided for the positive electrode. It is thus necessary to remove moisture. However, many electroconductive polymers such as polyaniline are hygroscopic, some containing moisture in an amount of several ten percents order. Thus the fabrication of conventional polymeric lithium cells needs a great amount of labor in moisture removal. The moisture removal is a cumbersome and time-consuming procedure which adds to the manufacture cost. In one preferred embodiment of the present invention, a cell is prepared by setting a positive electrode comprising as an active material an electroconductive polymer such as polyaniline having a moisture content in the range between more than 1,000 ppm and 50,000 ppm, especially between 3,000 ppm and 10,000 ppm, a negative electrode comprising lithium such as metallic lithium, lithium alloy or lithium-carbon composite material, non-aqueous electrolyte and other necessary components in a cell container, and keeping the cell to allow the moisture of the positive electrode to slowly react with lithium of the negative electrode such that the moisture content of the positive electrode is eventually reduced to ⅓ or lower, especially 1/10 or lower of the original moisture content. This process significantly simplifies the removal of water from the conductive polymeric material, leading to efficient fabrication of a cell and even a non-aqueous electrolyte cell having improved performance including initial discharge and long-term storage.

The conductive polymeric materials adapted for use as the positive electrode include polyaniline, polypyrrole, polythiophene, polyfuran, polyacetylene, poly-para-phenylene, and polybenzene. Among them, polyaniline is most advantageous because it usually has a moisture content of about 3,000 to 10,000 ppm under atmospheric conditions so that it is ready for fabrication of a cell without any processing or only after simple drying. It is to be noted that the polyaniline used herein may be either apolyaniline prepared by chemical oxidative polymerization or a polyaniline prepared by electrolytic oxidative polymerization, with the latter being preferred. The electrolytic oxidative polymerization is advantageous in that polyaniline deposits on an anode substrate with firm adhesion therebetween and the polyaniline deposited substrate may be utilized as a current collector of the cell electrode or a casing, further contributing to simplification of the cell fabricating process. The electrolytic polyaniline has another advantage in the aspect of cell performance in that it provides a secondary cell with a reduced internal resistance.

When conductive polymeric materials other than polyaniline are used as positive electrode active material or when the polyaniline used has a too much moisture content, it is preferred to control their moisture content to the range between more than 1,000 ppm and 50,000 ppm, especially between 3,000 ppm and 10,000 ppm. Such moisture control may be carried out by any desired simple techniques, for example, heating, drying in vacuum at room temperature or elevated temperatures, and dipping in a non-aqueous solvent or solution capable of moisture absorption Either of these techniques will take a short time or a low energy in order to control the moisture content to the desired level. It is to be noted that even polymeric materials other than polyaniline may be used as electrode material without moisture removal insofar as their original moisture content is within the above-defined desirable range.

If conductive polymeric materials having a moisture content of up to 1,000 ppm are used according to the prior art common knowledge, then not only the cell manufacturing process is no longer simplified, but no improvements in initial discharge and long-term storage are expectable. On the contrary, if conductive polymeric materials having a high moisture content of more than 50,000 ppm are used, not only the majority of lithium in the negative electrode undergoes reaction with water, resulting in a substantial loss of effective lithium as negative electrode active material, but also the reaction of lithium with water rapidly proceeds to instantaneously produce a large amount of gas, leading to a risk of cell explosion.

In the preferred embodiment of the present invention as described above, a cell is prepared by setting a positive electrode, a negative electrode, and non-aqueous electrolyte in a cell container and treating the negative electrode with the moisture of the positive electrode. The moisture treatment may be effected simply by allowing the completed cell to stand for three days or longer. If more than ⅓ of the original moisture content remains in the positive electrode, too vigorous reaction would suddenly occur to give rise to cell failure during actual service of the cell, and no improvements in initial discharge and long-term storage are observable. It is thus preferred that the moisture content of the conductive polymeric material constituting the positive electrode is eventually reduced to ⅓ or lower, especially 1/5 or lower of the original moisture content. Then the cell is ready for use.

According to the second aspect of the present invention, the lithium-containing negative electrode is treated with lithium hydroxide. This treatment may be carried out by covering the surface of negative electrode material with lithium hydroxide.

The mechanism that cell performance is improved by covering the negative electrode with lithium hydroxide is not well understood. While not being bound to the theory, we suppose that lithium hydroxide acts as a kind of ion conductor. The lithium hydroxide coating allows for smooth migration of lithium ions and prevents the negative electrode from reacting with the electrolyte during charge/discharge cycles of the cell. Ion conductors having such action are known in the art including $Li_3N$, $LiAlF_4$, $LiTaO_3$, $LiNbO_3$, and $LiSiO_4$-$Li_3PO_4$, but all of them are very unstable compounds and thus difficult to handle. In contrast, lithium hydroxide is a stable compound and has many advantages including ease of handling as in covering of the negative electrode and its stability in the cell. Lithium hydroxide is thus a preferred ion conductor for use in lithium cells.

The negative electrode material may be covered with lithium hydroxide by any desired methods although either of the following methods or a combination thereof may preferably be employed.

(1) Deposition of lithium hydroxide powder on a surface of negative electrode material.

(2) Placement of a lithium hydroxide sheet on a surface of negative electrode material or on the surface of a separator adjacent to the negative electrode if the separator, described later, is used in the cell.

In method (1), deposition means that lithium hydroxide is present on the negative electrode. The negative electrode material may be coated with lithium hydroxide. The powder lithium hydroxide used preferably has as an equal particle size as possible. It is also preferable to force a lithium hydroxide deposit on the negative electrode by a mechanical press or the like so as to lodge lithium hydroxide particles into the electrode material to some depth, thereby achieving a firm attachement of lithium hydroxide to the electrode.

In method (2), the lithium hydroxide sheet may be disposed on a surface of negative electrode material, more particularly at least on the surface of the negative electrode adjacent to the electrolyte in consideration of cell configuration. The lithium hydroxide sheet used herein preferably has a thickness of about 0.1 to about 100 μm, more preferably about 1 to about 50 μm.

In either of the foregoing methods or other methods, it is preferred that a lithium hydroxide layer is formed on the entire surface of the electrode. The amount of lithium hydroxide deposited on the electrode is not critical, but is preferably at least $1\times10^{-6}$ mol, more preferably at least $1\times10^{-5}$ mol per square centimeter of the electrode surface.

According to the third aspect of the present invention, the lithium-containing negative electrode is treated with $AsF_6$ ions or $PF_6$ ions.

The mechanism that cell performance is improved by using the lithium-containing negative electrode treated with $AsF_6$ or $PF_6$ ions is not well understood. While not being bound to the theory, we suppose that the treatment forms on the surface of the lithium-containing negative electrode a coating capable of preventing reaction with the electrolyte, rendering the negative electrode surface rather prohibitive to by-product formation.

The surface of the lithium-containing negative electrode may be treated with $AsF_6$ or $PF_6$ ions by any desired methods although it is preferred to dip the negative electrode in an organic solvent containing $AsF_6$ ions and/or $PF_6$ ions. The sources of $AsF_6$ and $PF_6$ ions are not critical and include $NaAsF_6$, $KAsF_6$, and $LiAsF_6$ as well as $NaPF_6$, $KPF_6$, and $LiPF_6$, to name a few. Preferred sources are $LiAsF_6$ and $LiPF_6$.

In the preferred embodiment in which the surface of the negative electrode is treated with $AsF_6$ or $PF_6$ ions by dipping the electrode in an organic solvent containing $AsF_6$ and/or $PF_6$ ions, further improvements in cell performance are accomplished by adding some water to the solvent. Although the exact mechanism is not well understood, we suppose as follows. The negative electrode is less prone to attack by $AsF_6$ and/or $PF_6$ ions because its surface has been covered with a coating, typically an oxide coating. Intentional addition of water to the treating solution causes the oxide coating on the negative electrode surface to be broken, allowing $AsF_6$ and/or $PF_6$ ions to attack the negative electrode material. In addition, the negative electrode surface itself is treated with water or the negative electrode is contacted with water, lithium in the negative electrode reacts with water to form on the surface thereof a coating which prevents lithium in the negative electrode from reacting with the electrolyte during charge or charge/discharge cycles of the cell, thus avoiding any loss of cell performance. Both breakage of an undesirable oxide coating and formation of a protective coating take place on the negative electrode surface with synergistic results. The organic solvent used in the dipping procedure preferably has a water concentration of from about 0.01 to about 50%, more preferably from about 0.05 to about 10%. Better results are obtained when the oxide and other coatings are positively removed from the negative electrode surface by conducting electric current flow across the negative electrode in the solvent.

The organic solvent preferably contains $AsF_6$ and/or $PF_6$ ions in concentrations of from about 0.5 to about 5 mol/liter, more preferably from about 1 to about 3 mol/liter. Any organic solvents may be suitably used as long as the ion sources such as $LiAsF_6$ and $LiPF_6$ are soluble in them. Preferred examples of the organic solvent used herein include propylene carbonate, dimethoxyethane, tetrahydrofuran, ethylene carbonate, γ-butyrolactone, and dioxolan, and mixtures of two or more of them.

When the negative electrode to be subjected to the above-mentioned ionic treatment is of a modified lithium material such as lithium alloy and lithium-carbon composite material, the electrode may be subjected to ionic treatment during its preparation. In the case of lithium alloy, ionic treatment may be carried out during the alloying of lithium with another metal. In the case of lithium-carbon composite material, ionic treatment may be carried out during the consolidation of lithium and carbon into a composite. More particularly, the lithium alloy may be electrochemically formed by electrodepositing lithium on an alloying metal in an organic solvent containing lithium ions and $AsF_6$ and/or $PF_6$ ions. Then ionic treatment takes place at the same time as the incorporation of lithium with the alloying metal. Better results are obtained when water is added to the organic solvent, as previously described.

In the lithium cells of the present invention, the type, shape and other factors of cell components other than the negative electrode, that is, the positive electrode, electrolyte and the like are not particularly limited as well as the cell configuration.

More particularly, the positive electrodes adapted for use in the lithium cells of the present invention include conductive organic polymeric materials as previously described, graphite, metal oxides such as $TiO_2$, $Cr_2O_3$, $V_2O_5$, $V_6O_{13}$, $MnO_2$, $CuO$, $MoO_3$, and $Cu_5V_2O_{10}$, metal sulfides such as $TiS_2$, $FeS$, $CuCoS_4$, and $MoS_3$, and metal selenides such as $NbSe_3$ and $VSe_2$.

The electrolytes used herein are those containing lithium ions. The source for giving lithium ions to the electrolyte may be selected from lithium salts such as $LiClO_4$, $LiBF_4$, $LiCF_3SO_3$, $LiAsF_6$, and $LiPF_6$ and mixtures of two or more of them.

Use of $LiAsF_6$ and $LiPF_6$ as the electrolyte is less desirable because of their toxicity and potential environmental pollution. The use of $LiAsF_6$ and $LiPF_6$ is not recommended in general and their amount should be reduced as small as possible if used. In general, cells are sealed. However, the toxicity of electrolyte will raise a serious problem when used cells are discarded or when the cell container is damaged to allow the electrolyte solution to leak therefrom. Therefore the amount of $LiAsF_6$ and $LiPF_6$ should desirably be as small as possible if used. However, it is very difficult to reduce the amount of $LiAsF_6$ and $LiPF_6$ at no substantial sacrifice of cell properties when they are used as the electrolyte. However, this problem is avoided by using the lithium-containing negative electrode which is previously treated with $AsF_6$ or $PF_6$ ions according to the present invention because a minimal amount of $AsF_6$ or $PF_6$ ions is sufficient for the treatment and can be solely retained on the negative electrode surface. Thus the use of the lithium-containing negative electrode which is previously treated with $AsF_6$ or $PF_6$ ions according to the present invention provides a lithium cell with improved properties.

These electrolytes are generally used as a solution in a suitable solvent. The solvent used herein is not particularly limited, but preferred examples include propylene carbonate, tetrahydrofuran, ethylene carbonate, dimethoxyethane, γ-butyrolactone, dioxolan, butylene carbonate, and dimethylformamide, and mixtures of two or more of them.

The electrolyte used in the cell of the present invention further includes organic solid electrolytes which are obtained by impregnating such polymers as polyethylene oxide, polypropylene oxide, isocyanate-crosslinked polyethylene oxide, and a phosphazene polymer having an ethylene oxide oligomer side chain with the above-mentioned electrolyte compounds; and inorganic solid electrolytes, for example, inorganic ion conductors such as $Li_3N$ and $LiBCl_4$ and lithium glass species such as $Li_4SiO_4$ and $Li_3BO_3$.

The lithium cell of the present invention is preferably constructed by interposing a separator between the positive and negative electrodes in order to prevent the electrodes from contacting each other to cause current shortcircuit. The separator is preferably a porous material which can be impregnated with and allow passage of the electrolyte solution, for example, woven and nonwoven fabrics and nets of synthetic resins such as polytetrafluoroethylene, polypropylene and polyethylene.

Remaining components necessary for the cell may be selected from commonly used ones. The cell configuration may be of any desired shapes including coin, button, box, and cylindrical shapes.

As described above, the lithium cells according to the present invention have a reduced internal resistance and improved storage stability as compared with the prior art conventional lithium cells, and exhibit improved cycle performance particularly when used as secondary cells.

EXAMPLES

Examples of the present invention are given below by way of illustration and not by way of limitation.

EXAMPLE 1

An aluminum disk having a diameter of 1.5 cm and a thickness of 200 μm was prepared. A lithium disk of a similar shape was press bonded to one surface of the aluminum disk to form a laminate. This press bonded laminate was maintained in contact with a spongy polymeric material containing 1% of moisture, dipped in a propylene carbonate solution containing $LiClO_4$, and allowed to stand for about two days. Under these conditions, moisture treatment and alloying took place at the same time. There was obtained a lithium-aluminum alloy electrode having been subjected to moisture treatment.

A coin type secondary cell having a diameter of 2.0 cm and a thickness of 1.6 mm was fabricated using the above-prepared lithium-aluminum alloy electrode as the negative electrode, polyaniline as the positive electrode, and a mixture of propylene carbonate and dimethoxyethane containing $LiBF_4$ as the electrolyte solution.

The cell was measured for cycle life by carrying out a charge/discharge test repeatedly, each cycle involving 1-hour charging with a constant current flow of 1.0 milliampere (mA) and 1-hour discharging. The cell withstood 2010 cycles of the charge/discharge test. The cell exhibited an internal resistance of 15 Ω and 17 Ω at the 1st and 1000th cycles, respectively, indicating a slight increase of internal resistance.

COMPARATIVE EXAMPLE 1

A coin type secondary cell was fabricated by the same procedure as in Example 1 except that no moisture treatment was effected on the lithium-aluminum alloy electrode.

The cell was measured for cycle life by the same test as in Example 1. The cell withstood 1151 cycles of the charge/discharge test. The cell exhibited an internal resistance of 15 Ω and 150 Ω at the 1st and 1000th cycles, respectively, indicating a marked internal resistance increase of 135 Ω.

EXAMPLE 2

A lithium electrode was prepared by momentarily contacting lithium with an atmosphere having a humidity of about 40% (1.3% by weight).

A coin type primary cell having a diameter of 2.0 cm and a thickness of 1.6 mm was fabricated using the moisture-treated lithium electrode as the negative electrode, manganese dioxide as the positive electrode, and a mixture of propylene carbonate and dimethoxyethane containing $LiClO_4$ as the electrolyte solution.

The cell was allowed to stand for 3 months at 60° C. The cell exhibited an internal resistance of 23 Ω at the initial and the aged cell exhibited an internal resistance of 27 Ω, indicating a slight increase of internal resistance even after 3-month storage.

COMPARATIVE EXAMPLE 2

A coin type primary cell was fabricated by the same procedure as in Example 2 except that no moisture treatment was effected on the lithium negative electrode.

The cell was allowed to stand for 3 months at 60° C. as in Example 2. The cell exhibited an internal resistance of 22 Ω at the initial and 50 Ω after aging, indicating an internal resistance increase as large as 28 Ω after 3-month storage.

EXAMPLES 3-4 & COMPARATIVE EXAMPLES 3-4

Four coin type secondary cells A through D having a diameter of 2.0 cm and a thickness of 1.6 mm were fabricated using polyanilines having the water content reported in Table 1 as the positive electrode, an aluminum disk having lithium press bonded thereto as the negative electrode, and a mixture of propylene carbonate and dimethoxyethane containing $LiBF_4$ as the electrolyte solution. The cells were allowed to stand for 20 days. The positive electrodes were measured for water content by Karl Fischer's method. The results are shown in Table 1.

The cells were measured for initial discharge capacity by discharging them up to 2.0 volts (V) with a constant current flow of 0.5 mA. Separately, the cells were stored for 100 days at 60° C. before they were measured for internal resistance at room temperature and 1 kHz. The results are also shown in Table 1.

TABLE 1

| | Polyaniline water content (ppm) | | Initial discharge | Internal resistance |
|---|---|---|---|---|
| | Assembled | Aged 20 days | capacity (mAh) | (Ω) |
| A (E3) | 49897 | 2691 | 3.91 | 31 |
| B (E4) | 3316 | 1012 | 3.02 | 30 |
| C (CE3) | 123 | 111 | 2.71 | 69 |
| D (CE4) | 110923 | 5632 | 0.91 | 131 |

EXAMPLE 5

An aluminum disk having a diameter of 1.5 cm and a thickness of 200 μm was prepared. A lithium disk of a similar shape was press bonded to one surface of the aluminum disk to form a laminate. Lithium hydroxide powder, 10 mg, was secured to the surface of the lithium disk by placing the powder on the disk surface and lightly pressing it.

A coin type secondary cell having a diameter of 2.0 cm and a thickness of 1.6 mm was fabricated using the lithium-aluminum laminate having lithium hydroxide attached thereto as the negative electrode, polyaniline as the positive electrode, and a mixture of propylene carbonate and dimethoxyethane containing $LiBF_4$ as the electrolyte solution. The cell was allowed to stand for a few days to form in situ a lithium-aluminum alloy negative electrode coated with lithium hydroxide.

The cell was measured for cycle life by carrying out a charge/discharge test repeatedly, each cycle involving 1-hour charging with a constant current flow of 1.0 mA and 1-hour discharging. The cell withstood 1980 cycles of the charge/discharge test.

COMPARATIVE EXAMPLE 5

A coin type secondary cell was fabricated by the same procedure as in Example 5 except that no lithium hydroxide was added.

The cell was measured for cycle life by the same test as in Example 1. The cell withstood 1093 cycles of the charge/discharge test.

EXAMPLE 6

A lithium electrode was prepared by adding 10 mg of powder lithium hydroxide on a lithium disk having a diameter of 1.5 cm and a thickness of 200 μm and lightly pressing the powder to cover the disk with lithium hydroxide.

A coin type parimary cell having a diameter of 2.0 cm and a thickness of 1.6 mm was fabricated using the lithium hydroxide-coated lithium disk as the negative electrode, manganese dioxide as the positive electrode, and a mixture of propylene carbonate and dimethoxyethane containing $LiBF_4$ as the electrolyte solution.

The cell was allowed to stand for 3 months at 60° C. The cell exhibited an internal resistance of 27 Ω at the initial and the aged cell exhibited an internal resistance of 30 Ω, indicating a slight increase of internal resistance even after 3-month storage.

COMPARATIVE EXAMPLE 6

A coin type primary cell was fabricated by the same procedure as in Example 6 except that the lithium disk negative electrode was not coated with lithium hydroxide.

The cell was allowed to stand for 3 months at 60° C. as in Example 6. The cell exhibited an internal resistance of 22 Ω at the initial and 50 Ω after aging, indicating an internal resistance increase as large as 28 Ω after 3-month storage.

EXAMPLE 7

An aluminum disk having a diameter of 1.5 cm and a thickness of 200 μm was prepared. A lithium disk of a similar shape was press bonded to one surface of the aluminum disk to form a laminate. The laminate was maintained for about 2 days in propylene carbonate having 1 mol/liter of $LiAsF_6$ dissolved therein, forming a lithium-aluminum alloy electrode. In the dipping procedure, 0.5% of water was added to the solution to enhance the effectiveness thereof.

A coin type secondary cell having a diameter of 2.0 cm and a thickness of 1.6 mm was fabricated using the above-prepared lithium-aluminum alloy electrode as the negative electrode, polyaniline as the positive electrode, and a mixture of propylene carbonate and dimethoxyethane containing $LiBF_4$ as the electrolyte solution.

The cell was measured for cycle life by carrying out a charge/discharge test repeatedly, earth cycle involving 1-hour charging with a constant current flow of 1.0 mA and 1-hour discharging. The cell withstood 2340 cycles of the charge/discharge test. The cell exhibited an internal resistance of 14 Ω and 19 Ω at the 1st and 1000th cycles, respectively, indicating a slight increase of internal resistance.

EXAMPLE 8

A lithium-aluminum alloy electrode was prepared by the same procedure as in Example 7 except: that $LiAsF_6$ was replaced by $LiPF_6$.

A coin type secondary cell was fabricated by the same procedure as in Example 7 except that the above-prepared lithium-aluminum alloy electrode was used as the negative electrode.

The cell was measured for cycle life by the same test as in Example 7. The cell withstood 1981 cycles of the charge/discharge test. The cell exhibited an internal resistance of 15 Ω and 20 Ω at the 1st and 1000th cycles, respectively, indicating a slight increase of internal resistance.

COMPARATIVE EXAMPLE 7

An aluminum disk having a diameter of 1.5 cm and a thickness of 200 μm was prepared. A lithium disk of a similar shape was press bonded to one surface of the aluminum disk.

A coin type secondary cell having a diameter of 2.0 cm and a thickness of 1.6 mm was fabricated using the lithium-bonded aluminum disk as the negative electrode, polyaniline as the positive electrode, and a mixture of propylene carbonate and dimethoxyethane containing $LiBF_4$ as the electrolyte solution. The cell was allowed to stand, causing lithium and aluminum in the negative electrode to alloy with one another within the cell interior.

The cell was measured for cycle life by the same test as in Example 7. The cell withstood 1081 cycles of the charge/discharge test. The cell exhibited an internal resistance of 15 Ω and 60 Ω at the 1st and 1000th cycles, respectively, indicating a considerable internal resistance increase of 45 Ω.

Obviously, numerous modifications and variations of the present invention are possible in light of the above teachings. It is therefore to be understood that within the scope of the appended claims, the invention may be practiced otherwise than as specifically described herein.

We claim:

1. In a lithium cell comprising a negative electrode containing lithium, a positive electrode, and an electrolyte disposed between the positive and negative electrodes, the improvement wherein said negative electrode has a coating thereon obtained by surface treating the negative electrode by contacting the negative electrode with a moist gas containing water in an amount of 0.3 to 50% by weight.

2. A lithium cell comprising a negative electrode containing lithium, a positive electrode, and an electrolyte disposed between the positive and negative electrodes, the improvement wherein said negative electrode has a coating thereon obtained by covering the negative electrode surface with lithium hydroxide powder or sheet.

* * * * *